United States Patent [19]

Serkez

[11] 4,118,001
[45] Oct. 3, 1978

[54] HANDBAG HOLDER

[76] Inventor: Alvin A. Serkez, 26 Tea Pl., Tappan, N.Y. 10983

[21] Appl. No.: 895,263

[22] Filed: Apr. 10, 1978

[51] Int. Cl.² ............................................. A47F 5/00
[52] U.S. Cl. ........................... 248/308; 24/230.5 AD; 248/205 R
[58] Field of Search ............... 248/205 R, 215, 300, 248/308, 307, 301, 304, 359, 360; 24/230.5 AD, 230.5 R

[56] References Cited

U.S. PATENT DOCUMENTS

| 253,737 | 2/1882 | McDonald | 248/308 |
| 938,998 | 11/1909 | Evans | 248/308 |
| 1,751,198 | 3/1930 | Franck | 248/215 X |
| 2,500,881 | 3/1950 | Stader | 248/304 X |
| 3,773,288 | 11/1973 | Bolton | 248/205 R X |
| 3,860,210 | 1/1975 | Berardinelli | 248/308 |
| 4,004,770 | 1/1977 | Karass | 248/215 X |

Primary Examiner—J. Franklin Foss
Attorney, Agent, or Firm—Hubbell, Cohen, Stiefel & Gross

[57] ABSTRACT

A handbag holder folds into a compact form smooth and free of surface projections. A flat region is provided for messages. Folding support and hook arms are fitted snugly with light friction so as not to come open unless intended. Ears on the arms are flush with the body when closed, and may be grasped for opening. When open, the support arm has a rubber friction foot for resting on a table, and the hook arm is grooved to receive the strap of the handbag.

9 Claims, 7 Drawing Figures

HANDBAG HOLDER

BACKGROUND OF THE INVENTION

1. Field of the Invention

This invention relates to devices that may be placed at an edge of a table or other support surface to provide a hook for holding the strap of small articles such as purses, camera cases, shopping bags, umbrellas, and the like.

2. Description of the Prior Art

Prior art handbag holders are not very compact, even when folded, and are irregular in shape, tending to catch on other things when carried about in coat pockets or ladies' handbags. An example of such prior art product is a handbag holder commercially distributed under the name "hang-on" by Efson, Inc. of Hauppauge, New York. This holder has a built in swivel support disc and a fixed U-shaped hook to which the swivel support disc is attached at one end. The U-shaped hook causes the holder to snag on loose items when carried in a handbag prior to use, and therefore requires the use of a separate case. Moreover, the fixed U-shape requires a case which occupies wasted volume in a handbag while being carried prior to use. In addition, such devices can be used as business promotional gifts. In such instance, it is desirable to have a convenient place on the device for a message. Such a feature is lacking in the Efson device. Thus, although some of these problems may be solved by supplying a plastic envelope or case for storing the holder, such envelopes add to bulk, waste additional space, make one more item to carry, and tend to be left behind or lost. These disadvantages of the prior art are overcome by the present invention.

SUMMARY OF THE INVENTION

The holder of the present invention is in the form of a compact, elongated box open on the front, into which are snugly fitted a longer support arm and a shorter hook arm, pivoted, respectively, just within the ends of the box. When the holder is closed, the front surface is flush. Ears near the outer ends of the arms rest in slots formed in the box. Shoulders on the arms contact the ends of the box when they are opened to the desired angle, preventing their opening further. There is a rubber contact pad on the support arm, and a groove is formed across the hook arm to receive the strap of the bag.

DETAILED DESCRIPTION OF THE INVENTION

Figure 1:
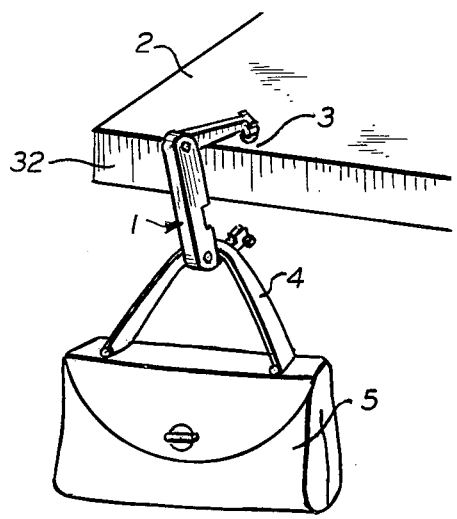
FIG. 1 is a perspective view of the open handbag holder resting on a table and holding the strap of a handbag.
Figure 5:
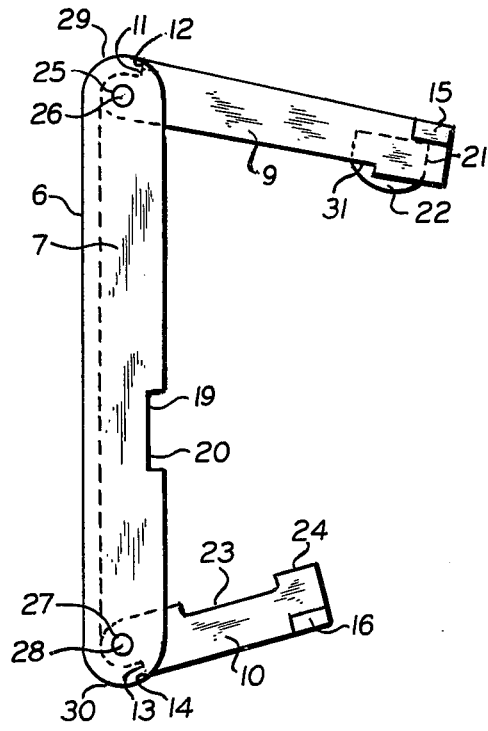
FIG. 5 is the side elevation view of the open handbag holder.
Figure 6:
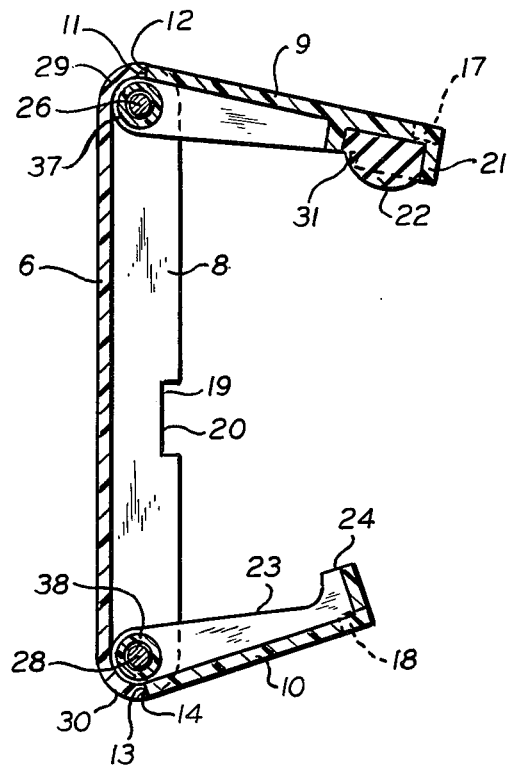
FIG. 6 shows a handbag holder similar to that of FIG. 5, but showing the rear half, in section.

The preferred embodiment of the invention is shown open and in use in FIG. 1, wherein the handbag holder 1 rests at point 3 near an edge of table 2, holding strap 4 of a purse 5. Referring also to FIG. 5 and FIG. 6, it can be seen that the transverse groove 23 formed in the lower support arm 10 provides a place for strap 4 to rest, from which it will not easily fall out.

Elastomeric foot 22 is held in cavity 21 of upper support arm 9, and has a rounded portion which extends beyond the cavity, and arm 9 is relieved at the underside 31. Accordingly, handbag holder 1 is free to swing back and forth somewhat while continuing to rest on foot 22.

Again referring to FIGS. 1, 5 and 6, because the upper support arm 9 is longer than the lower hook arm 10, and within the swing just mentioned, the handbag holder 1 can still be used in the intended manner when a heavy table cloth (not shown) on the table hangs over the table edge 32, or when edge 32 is of greater thickness (not shown) than the distance between point 24 on lower hook arm 10 and foot 22 on upper support arm 9.

The handbag holder may be made of metal, plastic, wood, ivory, or other suitable materials, or combinations of the above. The preferred embodiment is injection molded of ABS plastic, excepting for the elastomeric foot. Elastomeric foot 22 is preferably made of rubber, and is preferably held in place by being made slightly larger than cavity 21 so that it fits tightly when pushed into place. Desirably, an adhesive, preferably rubber cement, is also used to insure that the rubber foot remains in place in the cavity 21.

Referring to FIG. 5, assembly is accomplished by press-fitting pin 26 (which is an interference fit with the pair of holes 25 but only a snug but rotatable fit with the corresponding aperture through upper support arm 9) through the first hole 25 in side wall 7, the aperture in upper support arm 9, and the second hole 25 in side wall 8. Similarly, pin 28 is pressfitted through the first hole 27 in side wall 7, the aperture in lower hook arm 10, and the second hole 27 in side wall 8. As before, pin 28 is an interference fit with the pair of holes 27 but only a snug but rotatable fit with the corresponding aperture through lower hook arm 10.

The preferred embodiment is shown in FIG. 6. Arms 9 and 10 are each formed as a "U" channel with the open side facing inwards towards the body. Filler sleeves 37 and 38 are assembled over pins 26 and 28, respectively, and axially fit snugly between the interior sides of the "U" channels of arms 9 and 10. Numerous variations of this structure are possible without departing from the spirit and scope of the present invention. For example, sleeves 37 and 38 may be formed integrally with arms 9 and 10, respectively or the arms may be entirely solid (excepting cavity 21 and the apertures for pins 26 and 28). Such variations will readily suggest themselves to persons of ordinary skill and are within the intended scope of this invention.

Figure 3:
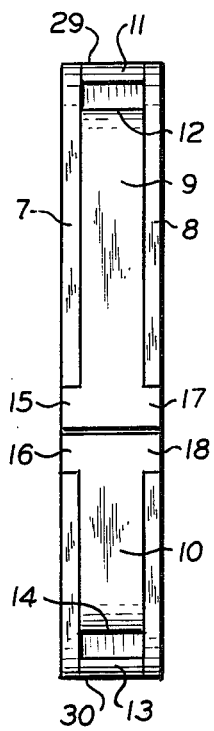
FIG. 3 is the front elevation view of the closed handbag holder.

Referring to FIGS. 5 or 6, and to FIG. 3, in the preferred embodiment the upper support arm opens out to an angle of approximately 75° from the closed position, at which angle shoulder 12 formed on upper support arm 9 contacts surface 11 of end 29, preventing further opening. Similarly, when the lower hook arm 10 opens to an angle of approximately 70° from its closed position, further opening is restrained by shoulder 14 formed on lower hook arm 10 contacting surface 13 of end 30.

Figure 2:
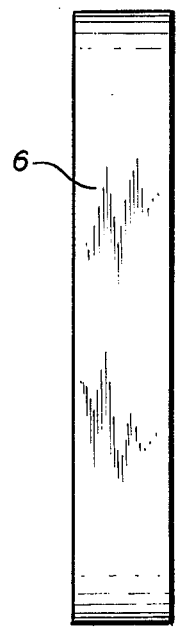
FIG. 2 is the rear elevation view of the handbag holder.
Figure 4:
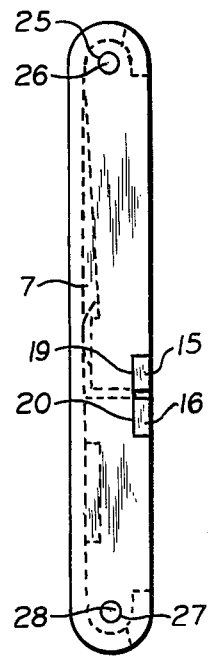
FIG. 4 is the side elevation view of the closed handbag holder.

As shown in FIG. 2, the preferred embodiment provides a smooth, flat region on the back 6 where advertising and identification messages (not shown) may be placed. As shown in FIGS. 3 and 4, sides 7 and 8 provide additional or alternate smooth, flat regions, having the same possible purpose. The presently preferred location for messages is back 6.

As illustrated in FIGS. 3–6, at the outer end of upper support arm 9 is formed an ear 15 or, preferably, a pair of ears 15 and 17, which in the closed position rests in recess 19 in side wall 7 or, preferably, rest in the pair of recesses 19 in side walls 7 and 8, respectively. The same configuration is used with respect to lower hook arm 10, having ears 16 and 18, which rest on recess or pair of recesses 20.

The ears reach a point just flush with the outside surface of side wall 7, or side walls 7 and 8 in the preferred version, where they are easily grasped by finger tips for opening.

Preferably, the arms 9 and 10 are formed just wide enough relative to the width of the space between side walls 7 and 8 of the body that they are snug, that is, that they fit into the body with light friction. Thus, they will not fall open unintentionally, but are easy to pull open by the ears using the finger tips. Further, this snugness, which also exists near the pivots when the holder is in open position, along with the snug but rotatable fit of the pins, will insure that the arms will not swing about freely when open, but rather will stay open until intentionally closed.

Figure 7:
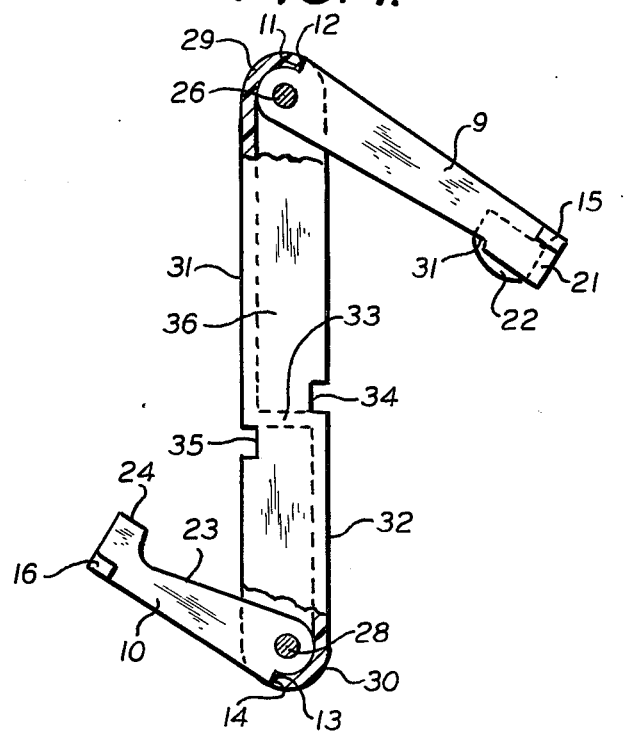
FIG. 7 shows a variation of the handbag holder of FIG. 6, in which the arms open out in opposite directions.

A variation of the handbag holder of FIG. 6 is shown in FIG. 7, in which arms 9 and 10 open out in opposite directions, lower hook arm 10 being reversed. Instead of the long back wall 6 of FIG. 6 extending the entire length of the body, back wall 31 only extends part way, leaving an opening for the now reversed lower hook arm 10 to swing out on the back. A notch or pair of notches 35 is formed in side wall 36 or in both side walls to receive ear 16, or ears 16 and 18.

Similarly, there is in this variation (FIG. 7) a partial front wall 32, extending sufficiently far as to leave an opening for upper support arm 9 to swing out in the front, as before. Recess or pair of recesses 34 receive ear 15, or ears 15 and 17.

The relative locations of surface 11 of end 29 and shoulder 12 on upper support arm 9 are changed so that arm 9 preferably only opens out to an angle of approximately 45° in this variation. Similarly, surface 13 of end 30 and shoulder 14 on lower hook arm 10 are preferably so located that the lower hook arm 10 only opens out to an angle of approximately 45°.

If, as shown in FIG. 7, an optional bridge wall 33 runs tranversely to connect back wall 31 with front wall 32, then lower hook arm 10 must be made correspondingly shorter in order that it may swing into the shorter space in the body, or, alternatively, the body could be made that much longer.

The inventive handbag serves its full function when open and in use, securely supporting small objects off a table edge, yet posing no danger to fine furniture finishes. It closes to a small box of simple neatness, free of any protrusions to snag or catch other items, and comfortable to hold in the hand. It may be opened by the pads of the finger tips, not needing to be pried with fingernails or hairpins, yet will not fall open unintended.

While the invention has been described in its preferred form, various modifications may be made without departing from the spirit and scope thereof, and it is to be understood that the invention is not limited to the specific embodiments shown and described except as defined in the appended claims.

What is claimed is:

1. A handbag holder of the type having a support member connected to a hook member which is used by resting the support member near an edge of a substantially horizontal support surface, with the hook member extending over the edge where it may hold a hand strap associated with the article to be held thereby, wherein the improvement comprises a body in the shape of a long box with a first end and a second end, two side walls having a first pair of holes through said side walls and opposite one another within and adjacent said first end and a second pair of holes through said side walls and opposite one another within and adjacent said second end, and a back wall extending from said first end to said second end, defining a front opening; a first pivot pin mounted through said first pair of holes; a second pivot pin mounted through said second pair of holes; an upper support arm which is of a size of fit flush within the two side walls of the body and of a fixed length between one half and two thirds of the length of the body, said support arm having a first aperture through which said first pivot pin fits when said support arm is assembled within said body adjacent said first end, said support arm having a first shoulder which contacts said corresponding first end to prevent said support arm from being opened out from its closed position within said body more than a predetermined angular amount; and a lower hook arm which is of a size to fit flush within the two side walls of the body and of a length such that it fits within the space remaining in said body after said upper support arm has been assembled within said body, said hook arm having a second aperture through which said second pivot pin fits when said hook arm is assembled within said body adjacent said second end, said hook arm having a second shoulder which contacts said corresponding second end to prevent said hook arm from being opened out from its closed position within said body more than a predetermined angular amount, whereby the hook arms close flush into the side walls of said body to provide a compact, self-contained box-like configuration for carrying said handbag holder.

2. The handbag holder in accordance with claim 1 additionally comprising a smooth, flat region formed on said body to provide a place for messages.

3. The handbag holder of claim 1, wherein said upper arm is formed to define a cavity distant said first aperture and facing inwards towards said body when said support arm is assembled within said body and additionally comprising an elastomeric foot fitted within said cavity with a rounded portion extending beyond said cavity, and means for retaining said foot in said cavity.

4. The handbag holder of claim 3, wherein said upper support arm is formed to have relief from a point adjacent said cavity decreasing towards said first aperture, said relief facing inwards towards said body when said support arm is assembled within said body.

5. The handbag holder of claim 1, wherein said lower hook arm is formed to have a transverse groove facing inwards towards said body when said hook arm is assembled within said body, said groove providing a place for said hand strap to rest when said holder is open.

6. The handbag holder of claim 1 additionally comprising a first ear formed on said upper support arm and a second ear formed on said lower hook arm, said ears being respectively distant from said first aperture and said second aperture and extending parallel said apertures for a distance substantially equal to said wall thickness, said body being formed to define a recess in said side wall to receive each of said ears when said support arm and said hook arm are closed flush into said body.

7. The handbag holder of claim 1 additionally comprising means for maintaining the arms in a closed position.

8. The handbag holder of claim 7, wherein the the means for maintaining the arms in a closed position is forming said upper support arm and said lower hook arm so as to fit snugly with light friction into said body.

9. The handbag holder of claim 1 additionally comprising a front wall extending from said second end only for such a length that an opening is defined in the remainder of said front just sufficient to accommodate said upper support arm, and said back wall extending from said first end only for such a length that an opening is defined in the remainder of said back just sufficient to accommodate said lower hook arm, so that said arms may be opened out from their closed positions in opposite directions, and that each of said shoulders on said arms will contact said corresponding end to prevent each of said arms from being opened from its closed position within said body more than a predetermined amount of substantially 45°.

* * * * *